B. QUESNOY.
TRUCK REEL FOR CONDUCTOR WIRES.
APPLICATION FILED NOV. 8, 1916.

1,260,044.

Patented Mar. 19, 1918.
2 SHEETS—SHEET 1.

Witness
H. H. Burton

Inventor
Bartholomew Quesnoy
By W. W. Williamson
Attorney

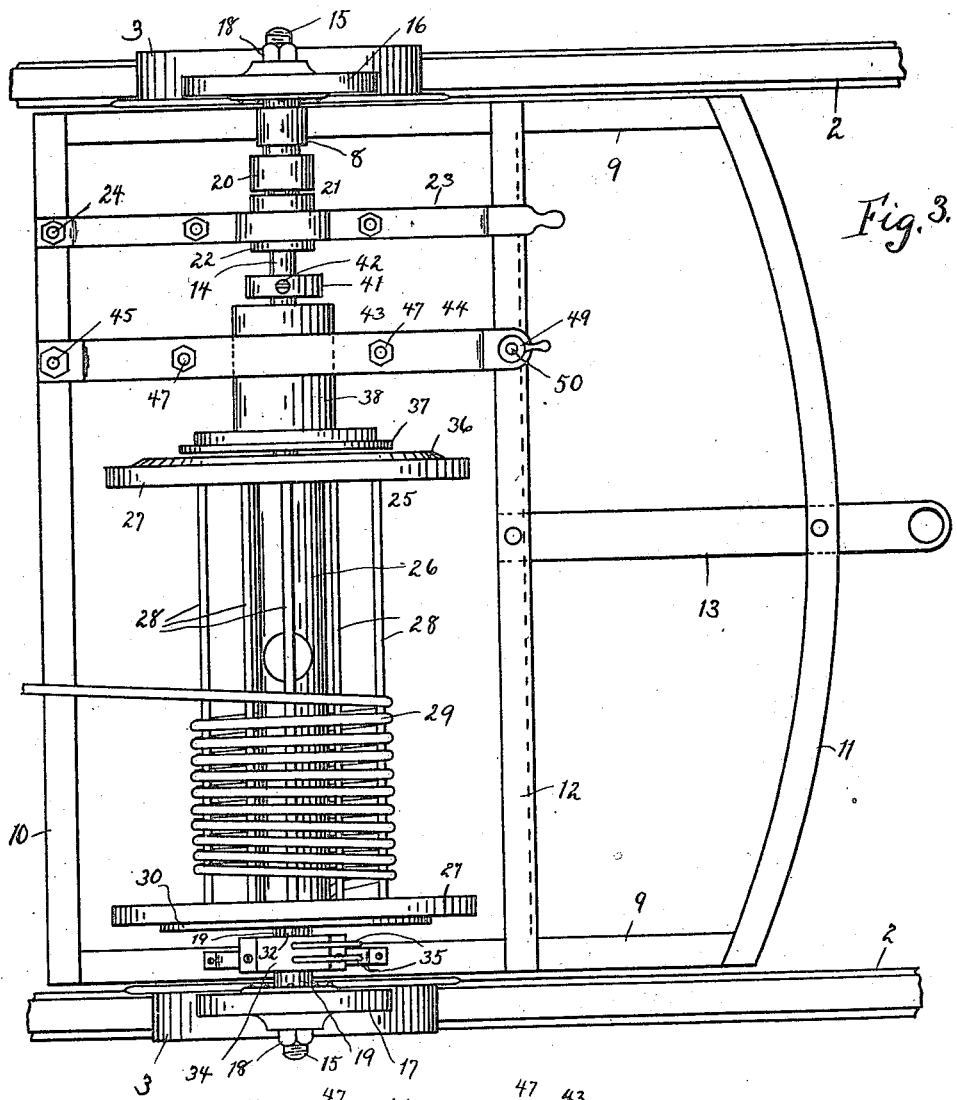

UNITED STATES PATENT OFFICE.

BARTHOLOMEW QUESNOY, OF ALTUS, ARKANSAS.

TRUCK-REEL FOR CONDUCTOR-WIRES.

1,260,044. Specification of Letters Patent. Patented Mar. 19, 1918.

Application filed November 8, 1916. Serial No. 130,187.

*To all whom it may concern:*

Be it known that I, BARTHOLOMEW QUESNOY, a citizen of the United States, residing at Altus, in the county of Franklin and State of Arkansas, have invented new and useful Improvements in Truck-Reels for Conductor-Wires, of which the following is a specification.

My invention relates to new and useful improvements in truck reel for conductor wires, and has for its object to provide an exceedingly simple and effective device of this character which will be automatic in operation when in use, and in which the parts will be placed in operative position by the simple movement of a single clutch.

A further object of the invention is to provide a device of this character wherein a cable reel is rotatably mounted upon a shaft suitably journaled in a truck of desirable construction, the movements of said truck actuating certain members to cause the reel to revolve with the shaft for winding up the cable or to run loose upon said shaft for unwinding the cable and to provide means coöperating with the first named means, whereby the hereinbefore mentioned movements of the reel may take place or the entire mechanism permitted to run free so that the truck may be moved from place to place without either winding or unwinding the cable.

A still further object of the invention is to provide a friction brake of peculiar construction for retarding the movements of the clutch member coacting with the reel, so that the revolving of the shaft will cause said member to move lengthwise of said shaft, whereby said member will be disengaged from or caused to engage the reel.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which—

Fig. 3, is a plan view thereof.

Fig. 4, is a side elevation of the friction brake; and

Fig. 5, is a similar view of the clutch lever.

Figure 1:
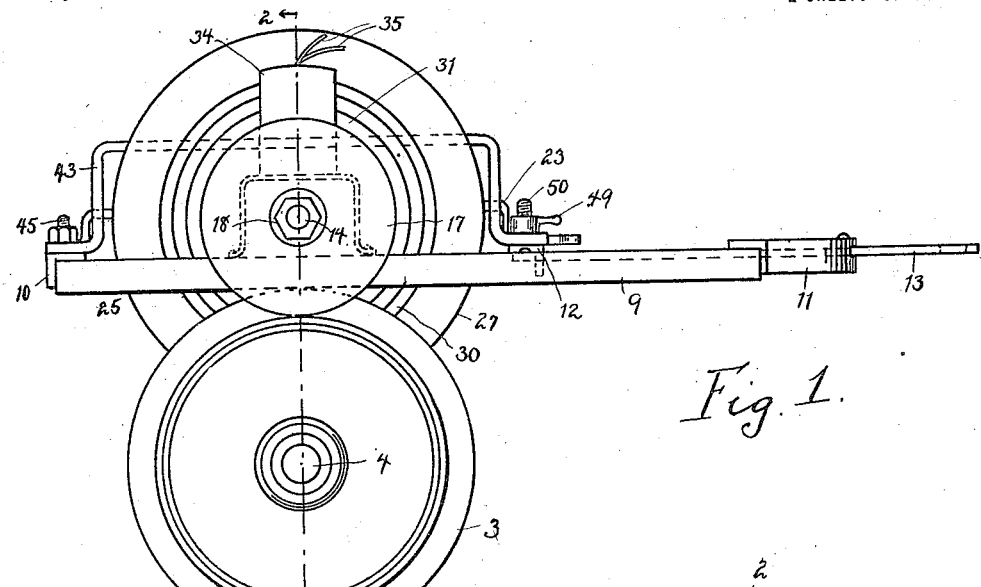
Figure 1, is a side elevation of my improved truck reel for conductor wires.

In carrying out my invention as here embodied 2 represents the rails of a track as ordinarily used in a mine and on these rails run the flanged wheels 3 of the truck here shown as provided with two wheels, but which may have any desirable number as best suited to the work and the place it is used.

The flanged wheels 3 are connected by an axle 4 journaled in suitable bearings 5 secured to the underside of and depending from the cross timber 6, the latter running lengthwise of and situated above the axle 4.

To the cross timber 6 at or adjacent the ends thereof are secured the uprights 7 on the upper ends of which is mounted the truck frame comprising a pair of parallel side members 9, a rear end member 10, a front end member 11 and an intermediate transverse or supporting member 12. To the supporting member 12 and the front end member 11 is secured the draw bar or draft rigging 13.

To the side members 9 are fastened the bearings 8 in which is journaled the shaft 14 having its ends projecting beyond the side members of the truck so as to overlie the flanged wheels 3 and the extreme outer ends of said shaft are threaded as at 15 for a purpose to be hereinafter described.

On the shaft adjacent its outer ends are revolubly mounted or journaled the friction wheels 16 and 17 held in place by nuts 18 screwed on the threaded ends 15 of the shaft. These friction wheels engage the wheels 3 and are revolved by the latter.

Each of the friction wheels is provided with a hub member 19 and the hub member connected with the wheel 16 carries the female member 20 of a clutch 21, said female member 20 adapted to be engaged by the male member 22 slidably mounted upon and splined or keyed to the shaft 14. The male member of the clutch is actuated by a clutch lever 23, one end of which is pivoted to the rear end member 10 of the truck as at 24 in any suitable and well known manner, the opposite end engaging the supporting member 12. When the clutch members are in engagement, motion and power are transmitted from the flanged wheels to the shaft 14.

Upon the shaft 14 in any suitable position between the side members of the truck frame is rotatably journaled the reel 25 comprising a sleeve 26 adapted to surround the shaft and provided with suitable lubricating means, a pair of circular flanges 27, one at each end of the sleeve and spokes 28 arranged between the flanges on which the conductor wires are to be wound, said wires here shown in the form of a cable 29.

Figure 2:
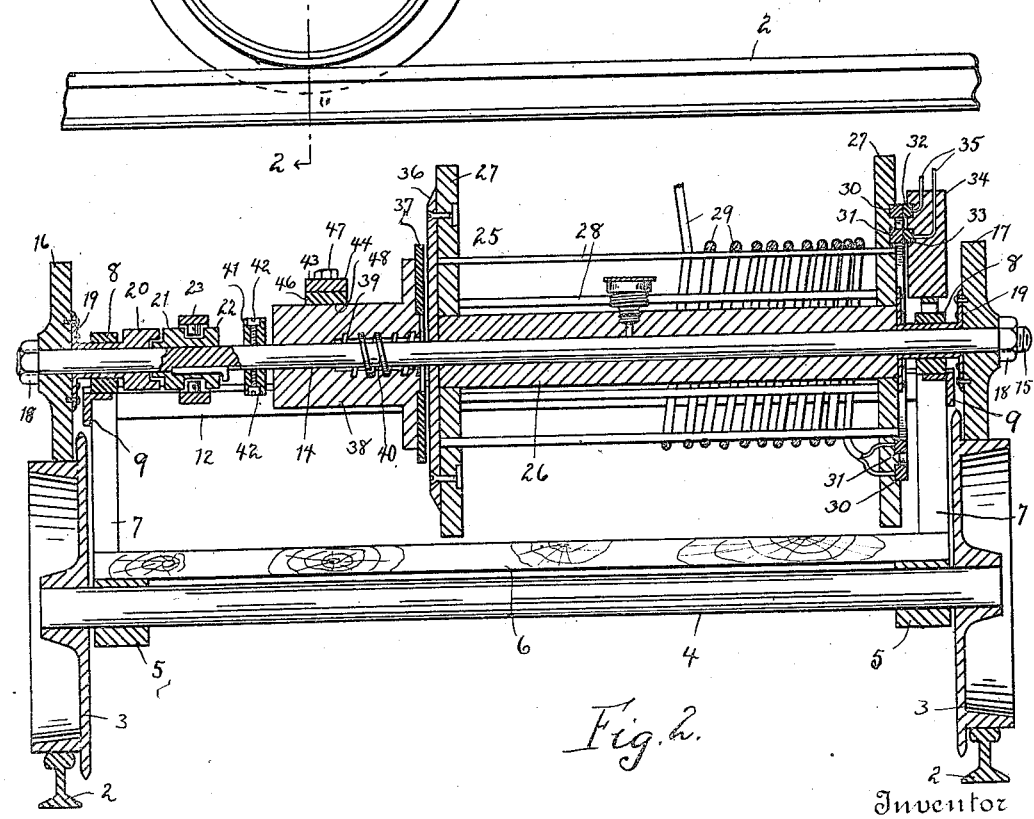
Fig. 2, is a section on the line 2—2 of Fig. 1.

The wires of the cable are connected in any suitable manner to the contact rings 30 and 31 carried by the outer flange of the reel and project beyond the outer face of said flange, said rings being preferably embedded in the flange as shown in Fig. 2. These rings contact with or engage suitable contact blocks 32 and 33 carried by a support 34 of suitable insulation material secured to any suitable portion of the device, such as one of the side members of the truck frame, and from these contact blocks lead the wires 35 adapted to be connected with an electrically operated tool.

On the outer face of the other flange is mounted a friction disk 36 such as wood or leather, and this coöperates with a similar friction disk 37 secured to the flange of the operatable member 38 of the friction clutch, the reel forming the other member of said clutch and for convenience being termed the inoperatable member. The member 38 is mounted upon the shaft 14 and provided with an internal thread 39 running only a portion of the length of said member, and this thread registers with a thread or screw 40 carried by the shaft 14 and revolving therewith. The member 38 under some conditions moves lengthwise of the shaft 14 and its outward movement is limited by a stop collar 41 adjustably secured upon the shaft 14 and held in place by suitable screws 42, and under certain other conditions the member 38 will revolve with the shaft or remain non-rotatable for a given length of time when the shaft is revolving, and said member is held stationary with relation to the shaft by means of a friction brake 43 comprising a resilient strip or bar 44 secured at one end to the rear end member 10 by means of any suitable fastening device 45, and a brake block or friction member 46 secured to the underside of the bar by means of suitable fastening devices 47, said brake block having an arcuate notch or cavity 48 therein corresponding to the curvature of the member 38 with which it coöperates.

The tension of the friction brake upon the member 38 is regulated by means of a hand-nut 49 mounted upon a screw or bolt 50 carried by the supporting member 12 of the truck frame projecting upwardly therefrom, and passing through the other end of the bar 44 said hand-nut engaging the upper or outer face of said bar.

In practice this reel truck for conductor wires is particularly adapted for use with coal cutting machines, as it is only necessary to throw in a single clutch to place the parts in operative position, so that the device may enter the room to be cut.

When it is desired to pass from the entry or main haulage way to one of the mine rooms, the clutch 21 is thrown in by its operating lever 23 which will cause the shaft 14 to revolve with the friction wheel 16 which obtains its power and movement from one of the flanged wheels 3 of the truck. During the passage of the truck into the room which is to be cut, the shaft 14 will be revolved in that direction which will cause the friction clutch member 38 to move lengthwise of the shaft away from the reel, said member being held non-rotatable by the friction brake 43, and since the member 38 is disengaged from the reel, the latter is allowed to run loose or free, which will permit the cable or conductor wires to be unwound from said reel, and when the member 38 has reached its outermost movement and is in contact with the stop collar 41, said member 38 will revolve with the shaft 14, since it can slip beneath the friction brake 43, or after said member 38 has reached its outermost position the pressure of the friction brake may be relieved by slightly backing off the hand-nut 49.

After the cutting has been completed, the truck is run out of the room backward which will cause the shaft 14 to revolve in that direction to move the friction clutch member 38 lengthwise of the shaft toward the reel until the friction disk 37 and 36 are in engagement, causing the member 38 and the reel to revolve with the shaft 14, and this pressure upon the reel 25 will cause said reel to bear against the hub member 19 of the friction wheel 17 with sufficient pressure to permit the transmission of power and motion from the other flanged wheel to the reel.

As soon as the friction clutch member 38 engages the reel the latter will begin to revolve with the shaft in that direction to wind up the cable or conductor wires. If the reel should revolve so fast as to wind up the cable too quickly, said cable will become taut, but will not break, as the reel, the shaft 14 and the friction wheels 16 and 17 will stop and the flanged wheels 3 of the truck continue to revolve and slip past or away from the friction wheels 16 and 17.

In other automatic truck reels, should the operator forget to throw the reel out of gear when going into a room, the cable will be unwound from the center, or in other words, the inner coils of the cable will be unwound and then rewound in the opposite direction, causing considerable trouble and loss of time, because it is necessary for the operator to then unwind the cable by hand and straighten it out. In my device this cannot happen as the movement of the truck causes the friction clutch member 38 to be disengaged from the reel or spool, whereby said reel will run free.

From the foregoing description it will be seen that I have produced a truck reel for conductor wires which is exceedingly simple in construction, which may be readily taken apart by an unskilled workman, repaired or the parts replaced, and which overcomes many of the disadvantages heretofore experienced.

Of course I do not wish to be limited to the exact details of construction as here shown, as these may be varied within the limits of the appended claims without departing from the spirit of my invention.

Having thus fully described my invention, what I claim as new and useful, is—

1. The combination in a truck reel for conductor wires of a truck provided with wheels, a shaft journaled in the truck, friction wheels journaled on the ends of said shaft and frictionally engaging the truck wheels, a clutch for locking one of the friction wheels to its shaft, a reel journaled on the shaft, and used as one member of a friction clutch, an operatable friction clutch member mounted upon the shaft and adapted to coöperate with the reel, said clutch member being threaded internally, a thread or screw carried by the shaft and registering with the internal threads of the operatable clutch member for causing said clutch member to travel lengthwise of the shaft when said clutch member is held non-rotatable, and means frictionally engaging said clutch member, temporarily stopping the rotation of said clutch member.

2. A truck reel for conductor wires comprising a truck frame, wheels supporting said frame, a shaft journaled in said frame projecting beyond the sides of said frame, the ends of said shaft being threaded, a reel journaled on said shaft and on which the conductor wires may be wound, means mounted on the shaft and rotatable therewith when in or out of engagement with the reel for causing said reel to revolve with the shaft or run free thereon and movable lengthwise on said shaft for causing said means to engage or be disengaged from the reel, friction wheels journaled on the shaft and coacting with the truck wheels, nuts screwed on the threaded ends of the shaft for holding the parts in position and means for causing the shaft to revolve with the friction wheels.

3. In a device of the character described, a truck, a shaft journaled therein, a reel journaled on said shaft comprising a sleeve, a pair of flanges and spokes arranged between said flanges, means having threaded engagement with the shaft for clutching or unclutching the reel to or from the shaft, a friction brake for applying pressure to said means for temporarily stopping the rotation of said means for causing said means to engage or be disengaged from the reel and means for transmitting motion to the shaft.

4. In a device of the character stated, the combination of a truck, a horizontal shaft journaled therein, a reel journaled on said shaft, a thread on said shaft adjacent one end of the reel, an operatable member mounted upon the shaft and having an internal threaded portion of less length than said member and adapted to coöperate with the threads on the shaft, a stop collar on the shaft for limiting the movement of the operatable member away from the reel and a friction brake coacting with said member to hold said member stationary with relation to the shaft until said member has engaged the stop collar on the reel after which said member will revolve with the shaft and slip beneath the friction brake, said member when in engagement with the reel, causing said reel to revolve with the shaft.

BARTHOLOMEW QUESNOY.

Copies of this patent may be obtained for five cents each, by addressing the "Commissioner of Patents, Washington, D. C."